US009132781B2

(12) United States Patent
Thibault

(10) Patent No.: US 9,132,781 B2
(45) Date of Patent: Sep. 15, 2015

(54) RACK SYSTEM WITH PIVOTING RAIL

(71) Applicant: TECHNO-FAB 9000 INC., Saint-Hyacinthe (CA)

(72) Inventor: Paul Thibault, Sainte-Julie (CA)

(73) Assignee: TECHNO-FAB 9000 INC., Saint-Hyacinthe (CA)

( * ) Notice: Subject to any disclaimer, the term of this patent is extended or adjusted under 35 U.S.C. 154(b) by 92 days.

(21) Appl. No.: 14/013,298

(22) Filed: Aug. 29, 2013

(65) Prior Publication Data

US 2014/0064893 A1 Mar. 6, 2014

Related U.S. Application Data

(60) Provisional application No. 61/697,028, filed on Sep. 5, 2012.

(51) Int. Cl.
*B60R 9/042* (2006.01)
*B60R 9/00* (2006.01)
*B60P 3/10* (2006.01)

(52) U.S. Cl.
CPC ............. *B60R 9/0423* (2013.01); *B60R 9/00* (2013.01); *B60R 9/042* (2013.01); *B60P 3/1025* (2013.01)

(58) Field of Classification Search
CPC ......... B60R 9/0423; B60R 9/042; E06C 5/02; E06C 5/00; B60P 3/1025; B60P 3/06; B60P 3/10; B61D 47/00
USPC ......... 224/309, 310, 315, 316, 319, 324, 405; 410/93; 414/409, 462, 487, 541, 546, 414/549
See application file for complete search history.

(56) References Cited

U.S. PATENT DOCUMENTS

| | | | |
|---|---|---|---|
| 3,452,893 A * | 7/1969 | Heflin | 414/462 |
| 5,058,791 A | 10/1991 | Henriquez et al. | |
| 5,297,912 A | 3/1994 | Levi | |
| 5,544,796 A * | 8/1996 | Dubach | 224/310 |
| 5,850,891 A * | 12/1998 | Olms et al. | 182/127 |
| 6,092,972 A | 7/2000 | Levi | |
| 6,315,181 B1 | 11/2001 | Bradley et al. | |

(Continued)

FOREIGN PATENT DOCUMENTS

| | | | |
|---|---|---|---|
| CA | 2535688 | 8/2007 | |
| FR | 2627730 A1 * | 9/1989 | B60R 9/06 |

*Primary Examiner* — Gregory Adams
(74) *Attorney, Agent, or Firm* — Benoît & Côté Inc.

(57) ABSTRACT

The present document describes a ladder rack system for displacing a ladder between a loading/unloading position on one of a side, a front and a rear of a vehicle and a stored position on a roof top of a vehicle, the ladder having a first ladder end and a second ladder end, the ladder rack system comprising: a first assembly to be mounted on a first end of the roof top for receiving the first ladder end; and a second assembly to be mounted on a second end of the roof top at a distance from the first end for receiving the second ladder end, the second assembly comprising: a pivoting rail to be pivoted between the loading/unloading position in which the pivoting rail extends substantially vertically or at an angle on the one of a side, a front and a rear of the vehicle and the stored position in which the pivoting rail extends longitudinally along the roof top; and a carriage slidably mounted on the pivoting rail for receiving the second ladder end and for sliding along the pivoting rail when the pivoting rail is in the loading/unloading position; wherein when the carriage is slid on the roof of the vehicle, the pivoting rail can be pivoted in the stored position longitudinally along the roof top.

17 Claims, 15 Drawing Sheets

(56) References Cited

U.S. PATENT DOCUMENTS

| | | |
|---|---|---|
| 6,360,930 B1 | 3/2002 | Flickenger |
| 6,427,889 B1 | 8/2002 | Levi |
| 6,764,268 B2 | 7/2004 | Levi |
| 7,097,409 B2 | 8/2006 | Richter |
| 2004/0047716 A1* | 3/2004 | Hendley et al. ............... 414/462 |
| 2004/0052622 A1* | 3/2004 | Chisnall ........................ 414/462 |
| 2005/0079036 A1* | 4/2005 | Richter ......................... 414/462 |
| 2006/0285954 A1* | 12/2006 | Neary ........................... 414/465 |
| 2007/0183875 A1* | 8/2007 | Thibault ....................... 414/462 |
| 2009/0140021 A1* | 6/2009 | Richter et al. ................ 224/310 |
| 2009/0145940 A1* | 6/2009 | Bukowiec ..................... 224/310 |
| 2010/0054902 A1* | 3/2010 | DiVerdi ........................ 414/785 |

* cited by examiner

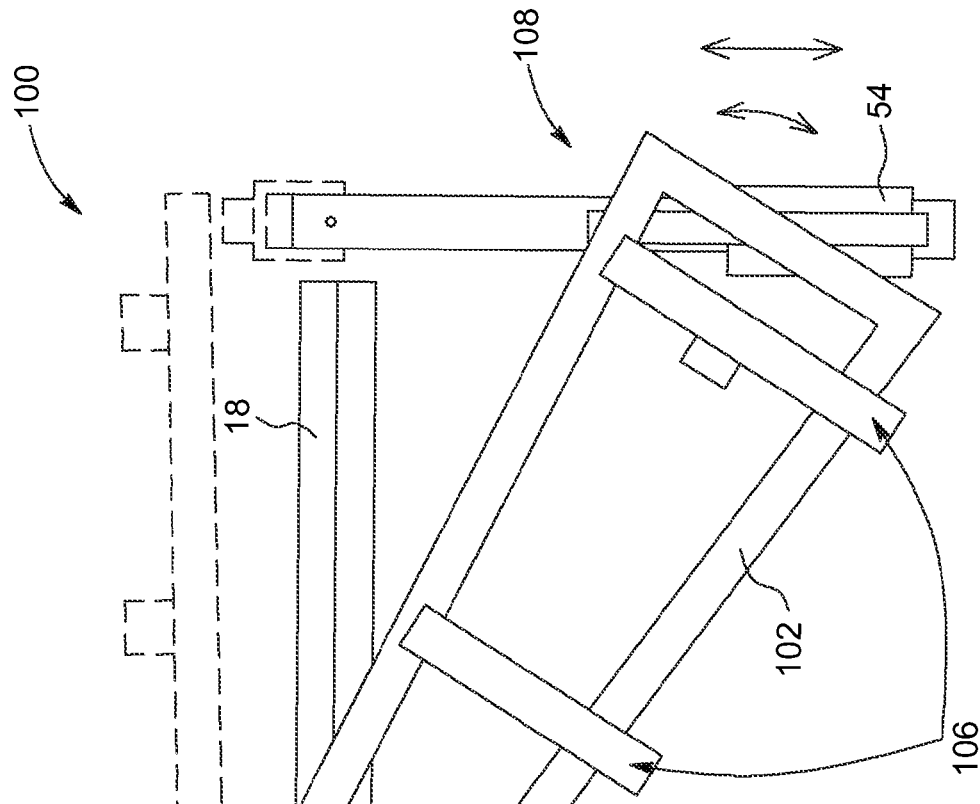
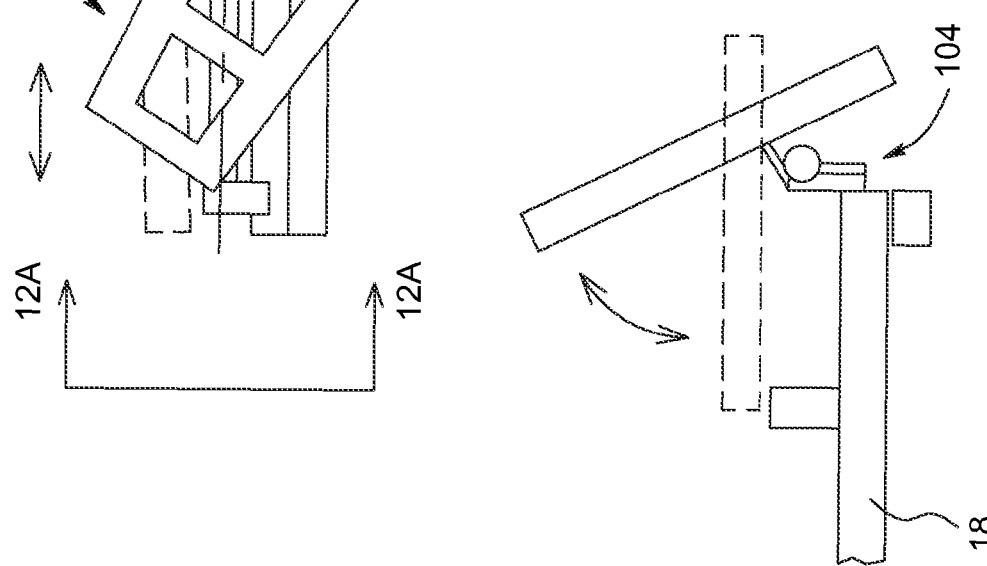
FIG. 12
FIG. 12A

RACK SYSTEM WITH PIVOTING RAIL

CROSS-REFERENCE TO RELATED APPLICATIONS

This application claims priority under 35 USC §119(e) of U.S. provisional patent application 61/697,028, filed on Sep. 5, 2012, the specification of which is hereby incorporated by reference.

BACKGROUND (a) Field

The subject matter disclosed generally relates to racks and methods for loading and unloading a ladder, a step ladder or a substantially longitudinal load on/from the roof of a vehicle and/or on/from a storing area, and more particularly relates to a ladder rack including a pivoting rail and a carriage.

(b) Related Prior Art

Many systems have been designed with the goal of loading a ladder on the roof of a utility vehicle and unloading the ladder from the side of the vehicle. The most predominant type of ladder rack system includes a frame for location on the roof of the vehicle, with a hook or grip affixed to the frame, near the front of the vehicle, and a pivoting mechanism affixed to the frame, near the rear of the vehicle. Such a system is described, for example, in Canadian patent application no. CA 2,535,688.

An advantage of such systems is that they are simple to operate, sturdy and yet relatively inexpensive. However, when in the unloading position, such racks are limited with regards to the distance from the ground at which the ladder can be lowered, when extending on the side of the vehicle.

When one wants to load a ladder with such a system, the top portion of the ladder is first hooked on the front hook. The bottom portion of the ladder is then elevated from the ground, and hooked on the rear hook of the back pivoting mechanism. With a handle, the pivoting mechanism is operated such that the ladder moves from the side of the vehicle up to the roof. As one can understand, when such a rack system is in the loading position on the side of the vehicle, the higher the rear pivoting mechanism is, the harder it will be to raise the bottom portion of the ladder up to rear hook.

In an attempt to overcome this drawback, other types of ladder racks have been designed. For example, U.S. Pat. No. 6,315,181 to Bradley et al. concerns a ladder rack provided with a carriage assembly located at its rear end. The carriage assembly includes a carriage mounted on a pivoting arm, the carriage sliding on the pivoting arm. The pivoting arm can pivot from the top to the side of the vehicle. When the arm extends on the side of the vehicle, the carriage slightly extends from the arm and allows lowering the rear portion of the rack, so as to ease the loading of the ladder. However, this system requires pivoting the complete rear portion of the rack, including the carriage, once the ladder is loaded, which requires a great amount of force, especially for heavy ladders.

Another system, described in U.S. Pat. No. 5,850,891 to Olms et al., proposes a rack system which includes a front static stationery rack and a rear pivotable and extendable ladder rack assembly (also referred to as a motorized rack). The rear rack assembly includes an elongated pivoting member and a sliding carriage member. The carriage includes telescoping members which telescope into the elongated pivoting member, allowing for the elongation of the rear rack assembly, such that when placed in the loading position on the side of the vehicle, the carriage member is closer to the ground. One drawback of such a system is that it is relatively complex and heavy.

Yet another ladder rack system involving a carriage is disclosed in U.S. Pat. No. 7,097,409 to Richter. The ladder rack of Richter includes a front pivot point and a rear hinged guide assembly on which a carriage can slide. One drawback of such system is that it is limited with regards to the height at which the ladder can be lowered when in the loading/unloading position.

Also known to the Applicant are the following U.S. Pat. Nos.: 5,058,791; 5,297,912; 6,092,972; 6,360,930; 6,427,889; and 6,764,268.

In light of the above, there is a need for an improved ladder rack system which allows lowering one end of the ladder closer to the ground when in a loading/unloading position. There is also a need for a ladder rack system which allows the ladder to easily move from a loading position to a stored position on the roof of the vehicle. Finally, this improved system should be compact and convenient when in the stored position. There is also a need for an improved rack system for displacing a substantially longitudinal load between a loading/unloading position on one of a side, a front and a rear of a storing area and a stored position on a surface of a storing area.

SUMMARY

According to an embodiment, there is provided a ladder rack system for displacing a ladder between a loading/unloading position on one of a side, a front and a rear of a vehicle and a stored position on a roof top of a vehicle, the ladder having a first ladder end and a second ladder end, the ladder rack system comprising: a first assembly to be mounted on a first end of the roof top for receiving the first ladder end; and a second assembly to be mounted on a second end of the roof top at a distance from the first end for receiving the second ladder end, the second assembly comprising: a pivoting rail to be pivoted between the loading/unloading position in which the pivoting rail extends substantially vertically or at an angle on the one of a side, a front and a rear of the vehicle and the stored position in which the pivoting rail extends longitudinally along the roof top; and a carriage slidably mounted on the pivoting rail for receiving the second ladder end and for sliding along the pivoting rail when the pivoting rail is in the loading/unloading position; wherein when the carriage is slid on the roof of the vehicle, the pivoting rail can be pivoted in the stored position longitudinally along the roof top.

According to another embodiment, the pivoting rail may comprise a fixed portion mounted on the second end of the roof top and a pivotable portion extending from the fixed portion and capable of pivoting relative to the fixed portion.

According to a further embodiment, when the pivotable portion of the pivoting rail is deployed substantially vertically along the vehicle and in alignment with the fixed portion, the carriage may slide from one of: the fixed portion to the pivotable portion and from the pivotable portion to the fixed portion and further wherein when the carriage is stored in the fixed portion of the pivoting rail, the pivotable portion can pivot between the loading/unloading position substantially vertical along the one of a side, a front and a rear of the vehicle and the stored position longitudinally along the roof top of the vehicle.

According to yet another embodiment, the pivoting rail may comprise a pivot assembly for pivotally connecting a pivoting end of the pivotable portion to an outer end of the fixed portion.

According to another embodiment, the fixed portion and the pivotable portion of the pivoting rail may each comprise a channel extending longitudinally therealong for allowing the carriage to slide along the pivoting rail and a sliding element slidably connected between the channel and the carriage adapted to slide within the channel.

According to a further embodiment, the channel may comprise two channels extending on both sides of the fixed portion and the pivotable portion of the pivoting rail.

According to yet another embodiment, the carriage may comprise a retaining assembly for retaining the first ladder end and a positioning mechanism connected to both the fixed portion and the pivotable portion of the pivoting rail for allowing alignment of the fixed portion and the pivotable portion of the pivoting rail when in the loading/unloading position.

According to another embodiment, the retaining assembly may comprise a U-shape plate and a hinged locking plate operatively connected to the U-shape plate for securing a ladder step of the ladder therein.

According to a further embodiment, the ladder rack system may further comprise a frame to be mounted on the roof top of the vehicle for receiving the first assembly and the second assembly at respective first and second ends of the roof top of the vehicle.

According to yet another embodiment, one of: the second assembly and the vehicle may comprise an attaching member for securing the pivoting rail to the vehicle when the second assembly is in the stored position.

According to another embodiment, the attaching member may comprise a first member to be attached to the vehicle and a second member to be attached to the pivotable portion of the pivoting rail.

According to a further embodiment, the ladder rack system may further comprise a carriage retaining member mounted on the fixed portion of the pivoting rail for retaining the carriage prior or during rotation of the pivotable portion of the pivoting rail between the loading/unloading position and the stored position.

According to yet another embodiment, the carriage may comprise a handle, a hook or any suitable combination for sliding the carriage along the rail.

According to another embodiment, the second assembly may comprise a damping assembly for damping longitudinal movement of the carriage when the pivoting rail is in the loading/unloading position and the carriage is moved towards a bottom end of the pivotable portion of the pivoting rail or for damping the pivoting rail when being pivoted between the loading/unloading position and the stored position.

According to a further embodiment, the ladder rack system may further comprise a motorized assembly operatively coupled to the second assembly for at least one of: moving the pivoting rail from the stored configuration to the loading/unloading configuration and for sliding the carriage up or down the pivotable portion of the pivoting rail.

According to another embodiment, the motorized assembly comprises: a motor; a pulling assembly operatively coupled to the motor and operatively connected to the carriage; and a controller for controlling the motor.

According to a further embodiment, the first assembly may comprise a hook having a first leg extending substantially vertically from the roof top and a second leg extending substantially horizontally along the roof top and further wherein the first assembly comprises a stopper for blocking an inner rail of the ladder when in the stored position on the roof top of the vehicle, the stopper comprising a section extending outwardly at an angle for forcing the inner rail of the ladder to slide in place in the first assembly when the second ladder end is raised above a ground surface.

According to yet another embodiment, the hook comprises an L-shape and an outer end with a flange projecting horizontally and inwardly towards the roof top of the vehicle for securing the ladder in place when in the stored position on the roof top of the vehicle.

According to another embodiment, there is provided a rack system for displacing a substantially longitudinal load between a loading/unloading position on one of a side, a front and a rear of a storing area and a stored position on a surface of the stored area, the substantially longitudinal load having a first load end and a second load end, the storing position being at a distance above the loading/unloading position, the ladder rack system comprising: a first assembly to be mounted on a first end of the storing area for receiving the first load end; and a second assembly to be mounted on a second end of the storing area at a distance from the first end for receiving the second load end, the second assembly comprising: a pivoting rail to be pivoted between the loading/unloading position in which the pivoting rail extends substantially vertically or at an angle on the one of a side, a front and a rear of the storing area and the stored position in which the pivoting rail extends longitudinally along the storing area; a carriage slidably mounted on the pivoting rail for receiving the second load end and for sliding along the pivoting rail when the pivoting rail is in the loading/unloading position; wherein when the carriage is slid on the surface of the storing area, the pivoting rail can be pivoted in the stored position longitudinally along the surface of the storing area.

According to a further embodiment, the substantially longitudinal load may comprise a first load mating connector near the first load end and a second load mating connector near the second load end, wherein the first assembly comprises a first assembly mating connector for releasably connecting with the first load mating connector and a second assembly mating connector for releasably connecting with the second load mating connector.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 12 is side schematic view of a ladder rack system, according to another embodiment;

FIG. 12A is a front view of a portion of the ladder rack system of FIG. 12; and

It will be noted that throughout the appended drawings, like features are identified by like reference numerals.

DETAILED DESCRIPTION

Figure 1:
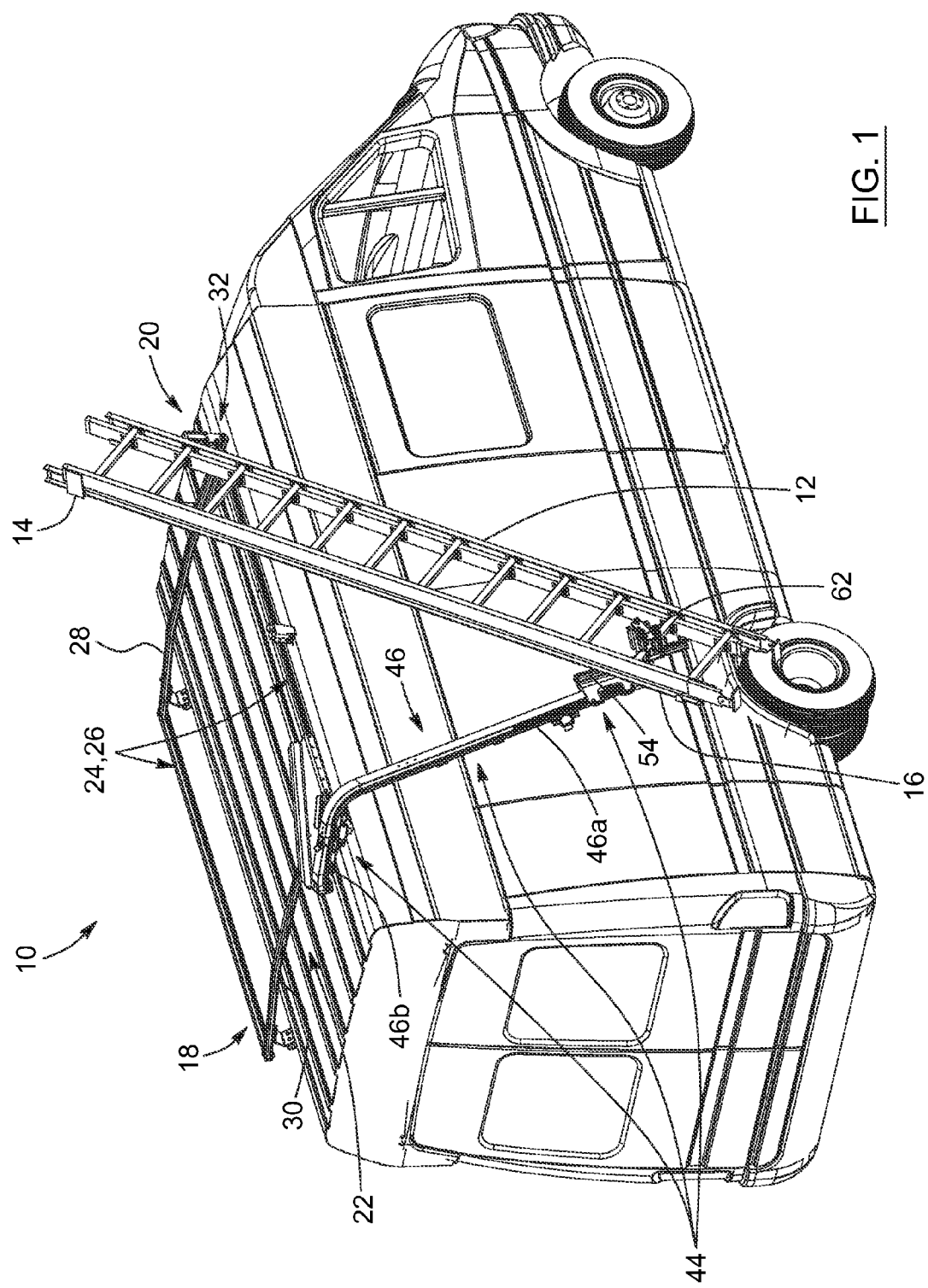
FIG. 1 is a side perspective view of a ladder rack system, in the loading/unloading position, according to an embodiment, and shown within its environment.

In embodiments there are disclosed ladder rack systems for loading/unloading ladders and ladder racks for loading/unloading substantially longitudinal loads.

Within the following description, similar features of the drawings have been given similar reference numerals. To preserve the clarity of the drawings, some reference numerals have been omitted when they were already identified in a preceding figure.

The embodiments described below are given by way of example only and the various characteristics and particularities thereof should not be considered as being limitative of the present invention. Unless otherwise indicated, positional descriptions such as "top", "bottom", "front", "rear" and the like should be taken in the context of the figures and should not be considered as being limitative.

It should be noted that within the present description, when referring to the "outer" and "inner" rails of the ladder, the "outer rail" is the lowermost rail when the ladder is loaded on the ladder rack system on the side of the vehicle. When the ladder is placed on top of the roof, the "outer rail" corresponds to the rail which is on the outer side of the vehicle. Consequently, the "inner rail" of the ladder is the uppermost rail when the ladder is loaded on the rack system on the side of the vehicle, or the innermost rail when the ladder is stored on the roof of the vehicle.

Also, while the ladder rack system shown in the Figures is placed on the roof of the vehicle, it can be considered to affix the ladder rack system on one of the top sides of the vehicle.

Figure 2:
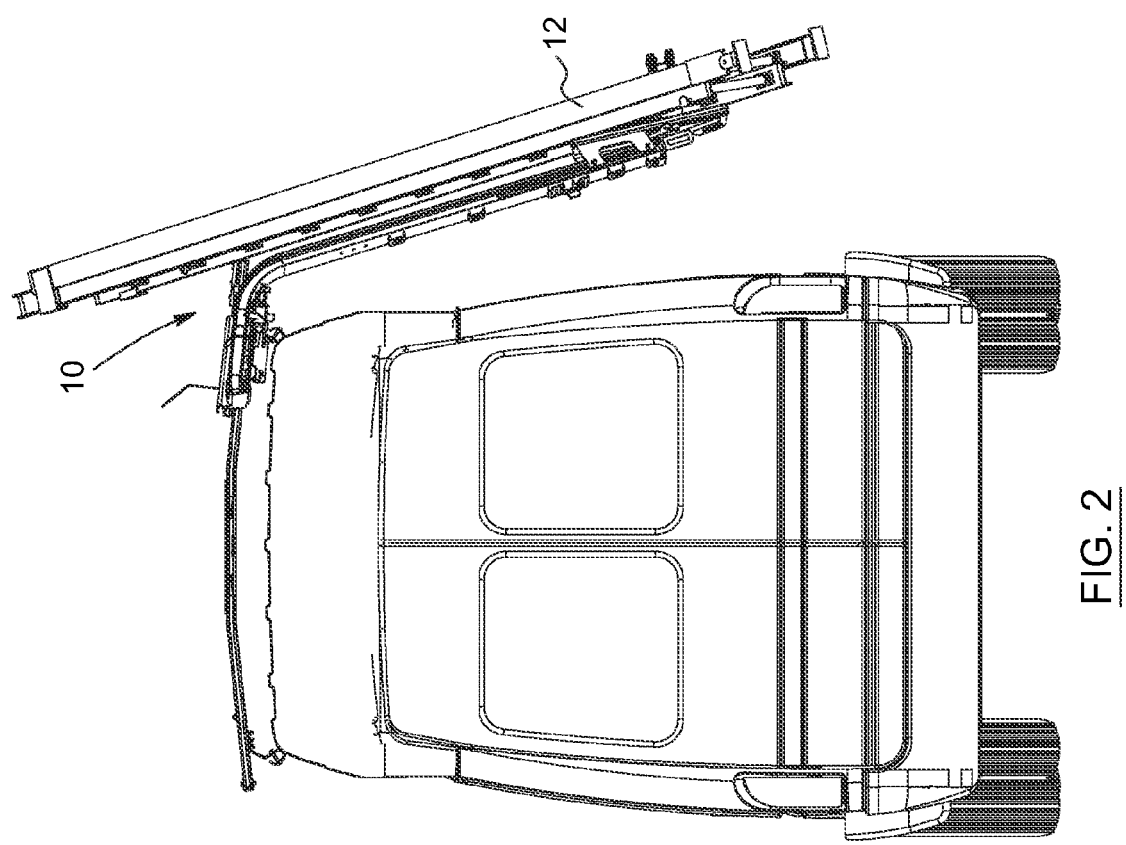
FIG. 2 is a rear view of the ladder rack system of FIG. 1, in the loading/unloading position, shown within its environment.

Referring to FIGS. 1 to 6, a ladder rack system 10 installed on a vehicle is shown, according to an embodiment. In FIGS. 1 and 2, the ladder rack system 10 is shown in a deployed or a loading/unloading position, the ladder 12 extending on a side of the vehicle. In FIGS. 3-6, the ladder rack system 10 is shown in a stored position, with the ladder 12 retained on the roof of the vehicle. It is to be noted that the vehicle may include a vehicle having wheels which includes or not an engine. For example, the vehicle may be a truck, a car, a trailer and the like such as to receive a ladder rack system 10 on its roof top or on at least part of its roof top.

Figure 3:
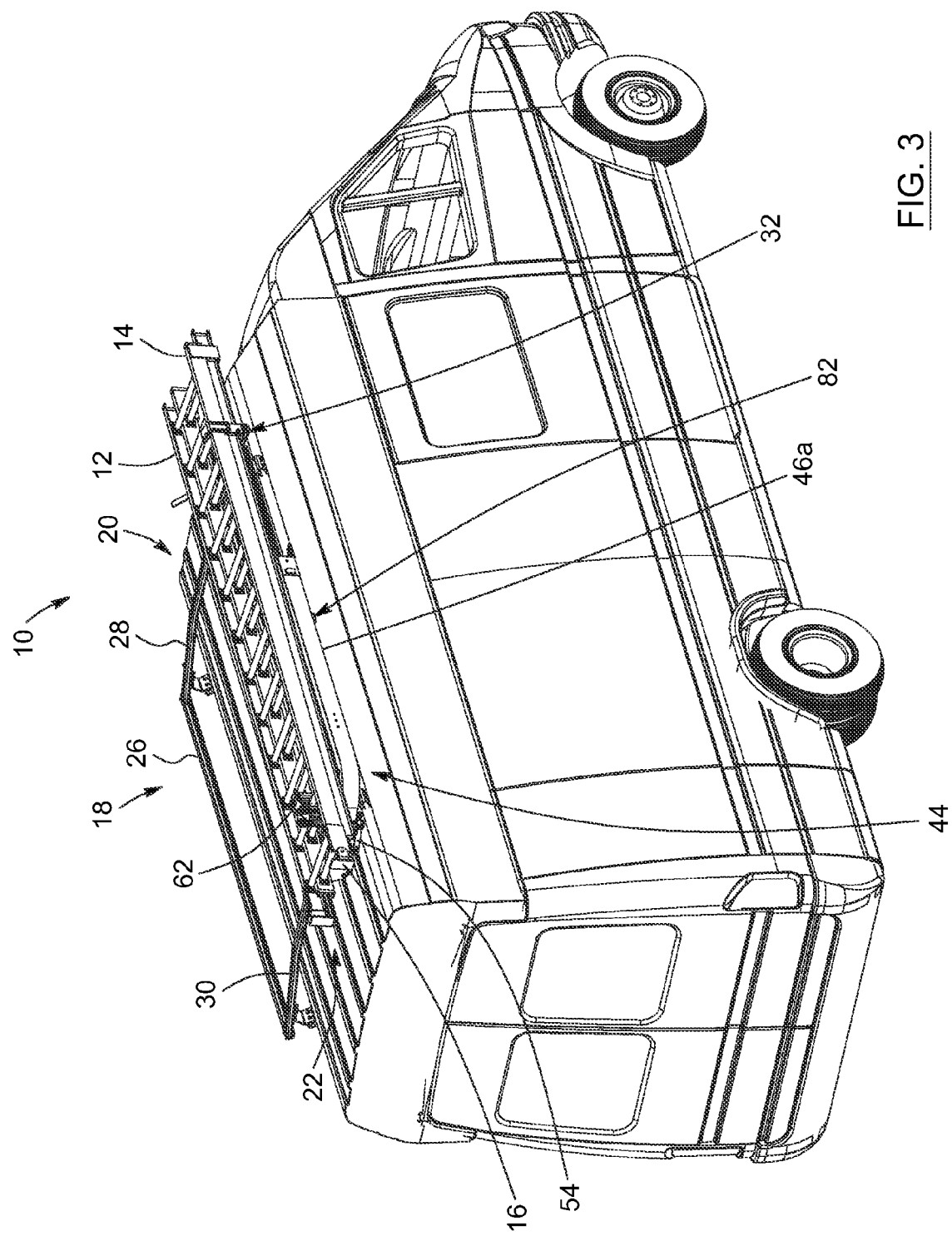
FIGS. 3 and 4 are two different side perspective views of the ladder rack system of FIG. 1 in a stored position, and shown within its environment.
Figure 4:
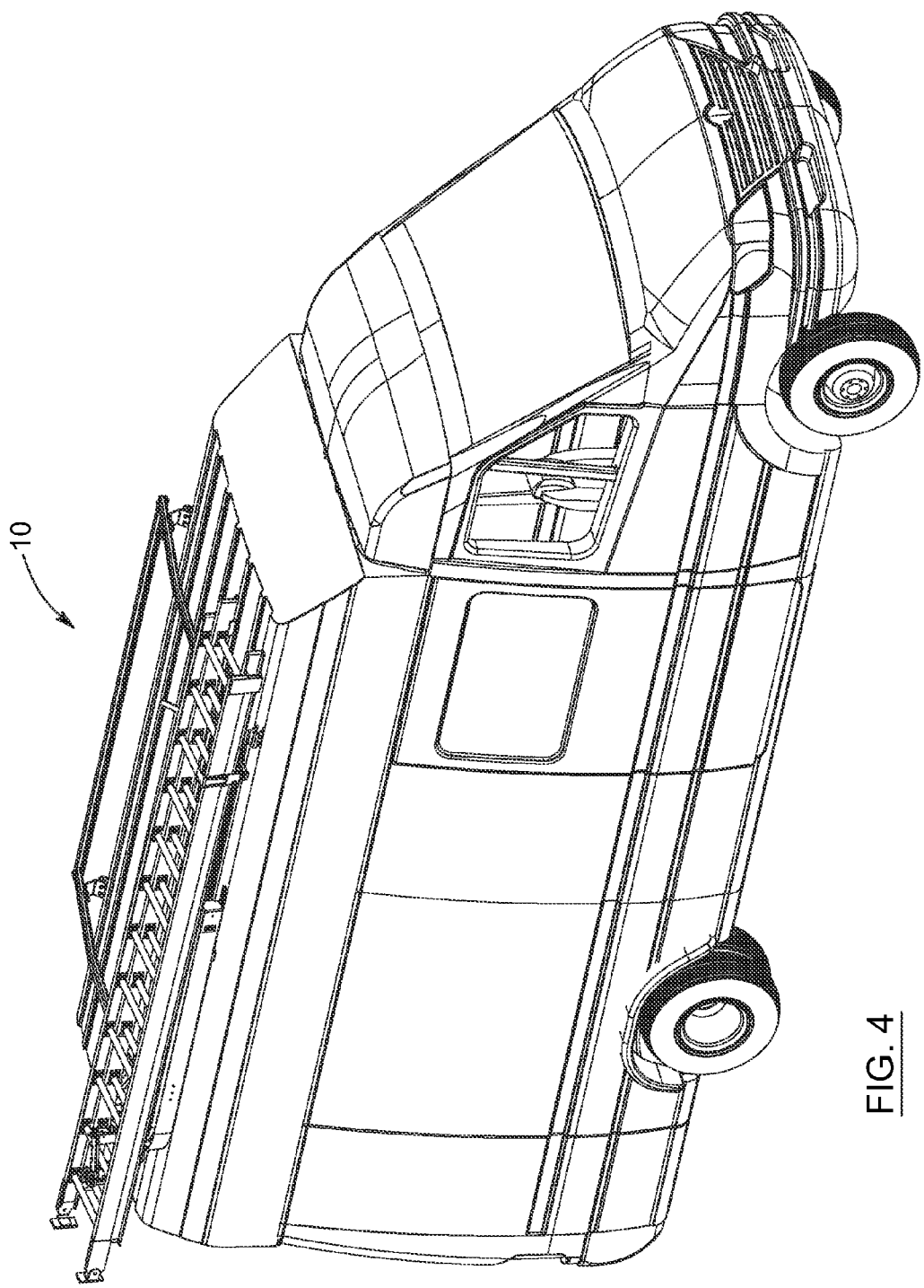
Figure 5:
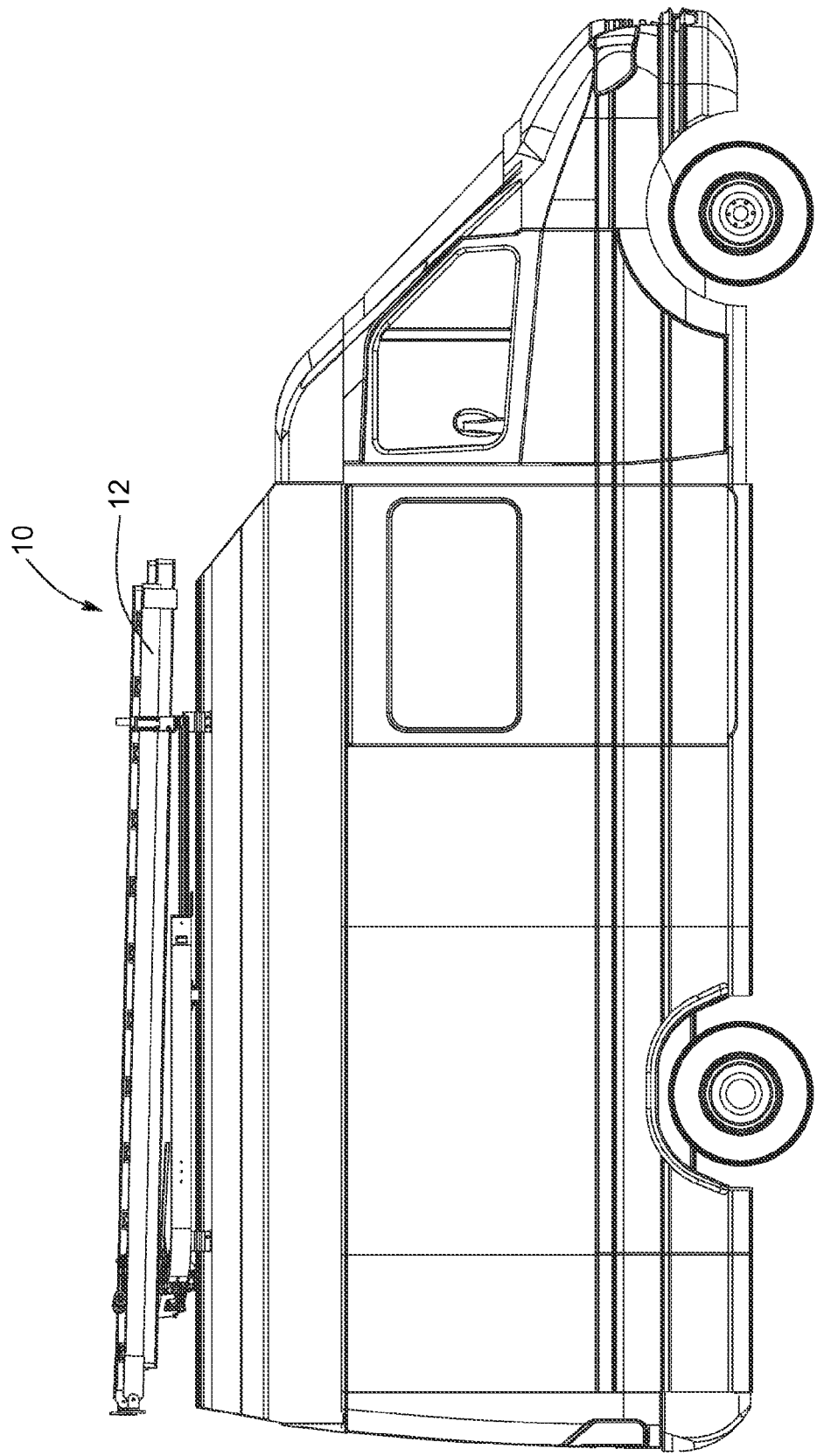
FIGS. 5 and 6 are respectively side and rear views of the ladder rack system of FIG. 1 in a stored position, shown within its environment.
Figure 6:
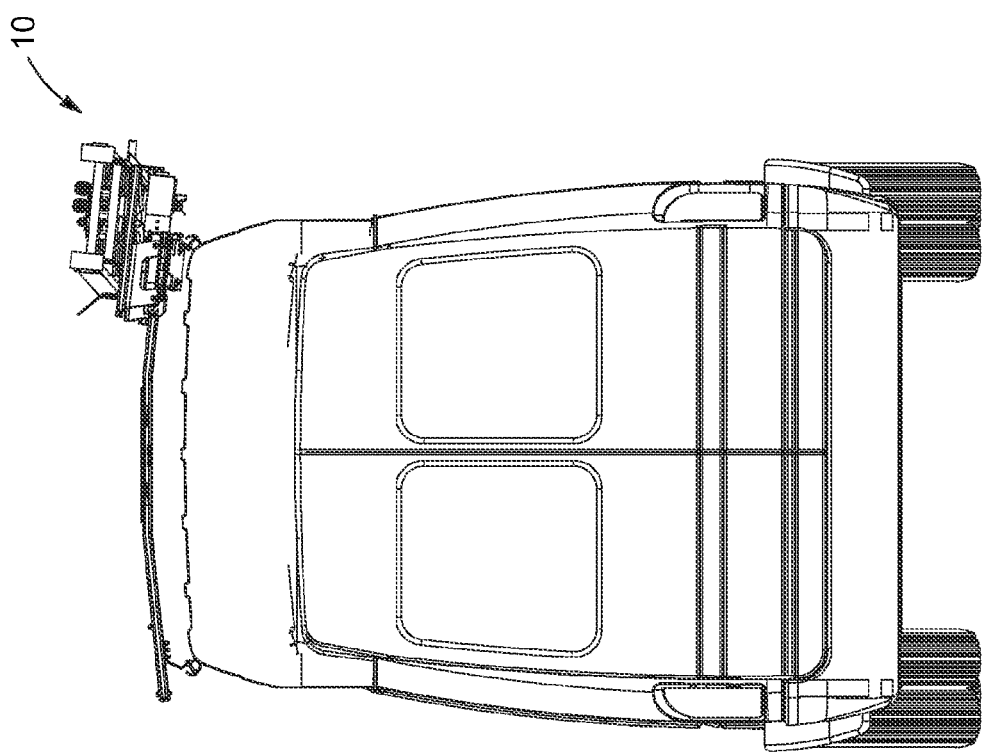

Referring to FIGS. 1 and 3, the ladder rack system 10 includes a frame 18 mounted on the roof of the vehicle. The frame 18 has a front section 20 located close to the front of the vehicle and a rear section 22 located at the rear of the vehicle. The frame 18 includes right and left longitudinal frame members 24, 26 extending on the right and left side of the vehicle, respectively. The frame 18 also includes front and rear transverse frame members 28, 30 extending transversally at the front and rear side of the roof of the vehicle, respectively.

The ladder rack system 10 also includes first and second assemblies 32, 44. In the embodiment illustrated, the first assembly 32 is a front ladder retaining assembly 32 connected to the front section 20 of the frame 18. The front ladder retaining assembly 32 is for retaining a first end 14 of the ladder 12, which generally corresponds to the top end of the ladder 12.

The second assembly 44 is connected to the rear section 22 of the frame 18, and is for retaining the second end 16 (or bottom end) of the ladder 12. The assembly 44 includes a pivoting rail 46 and a carriage 54 adapted to slide on the pivoting rail 46. The carriage 54 is provided with a retaining assembly 62 for receiving the second end 16 of the ladder 12, and in this case to secure one of the ladder rungs therein. The pivoting rail 46 includes a pivotable portion 46a and a fixed portion 46b. The fixed portion 46b is attached to the rear section 22 of the frame 18. The pivotable portion 46a can pivot relative to the fixed portion 46b, but it can be considered to have the pivotable portion 46a pivot relative to the frame 18, as long as the pivotable and fixed portions 46a, 46b can be placed in alignment with one another, in the loading/unloading position.

Figure 7:
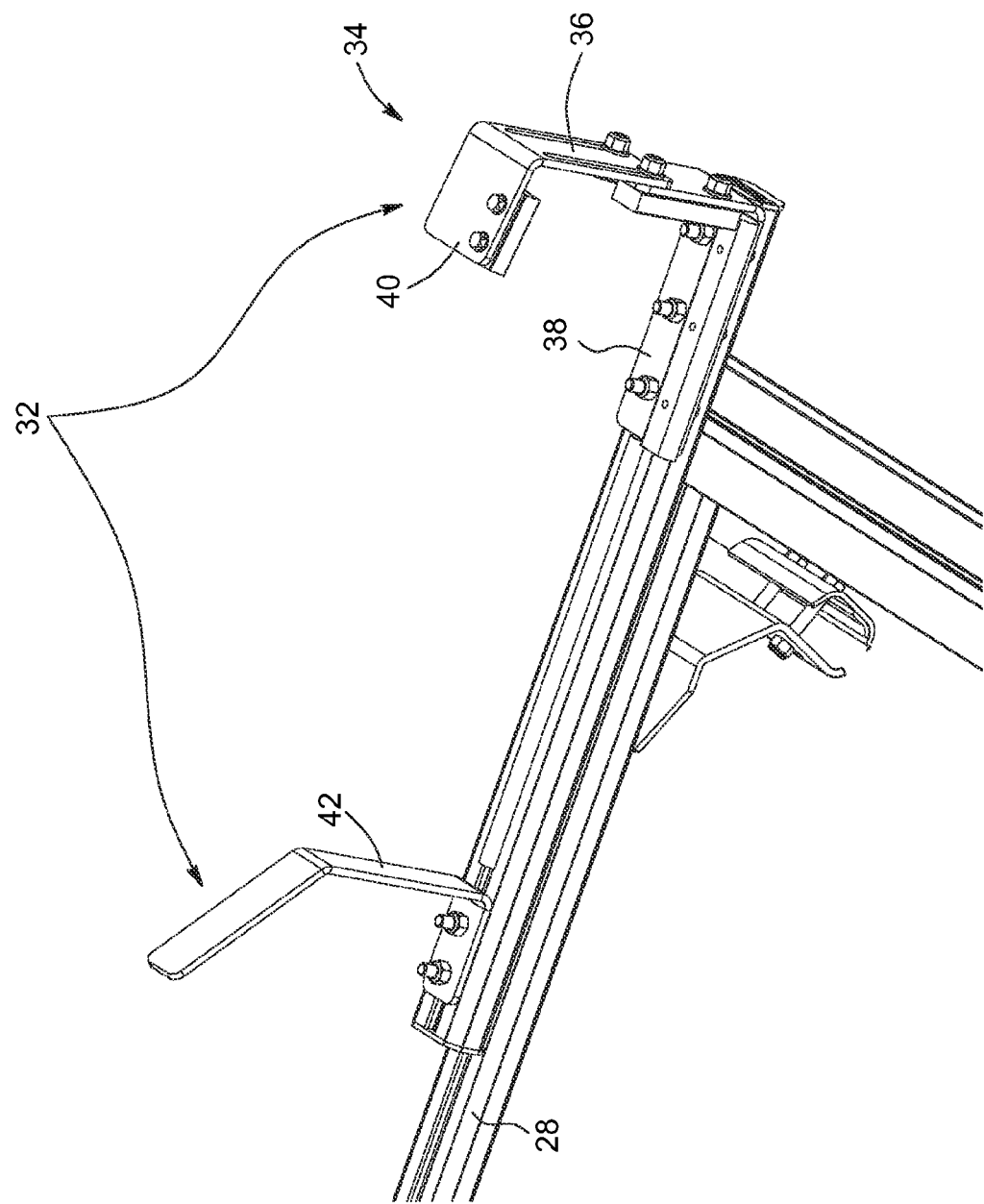
FIG. 7 is a partial side perspective view of a front portion of a ladder rack system according to another embodiment.

Referring now to FIG. 7, the front ladder retaining assembly 32 will be described in more detail. The first assembly 32 includes a hook 34 which has a first leg 36 extending vertically. The hook 34 preferably has an L-shape and is formed by a second leg 38 extending horizontally along frame 18. The first leg 36 of the L-shaped hook 34 has an outer end provided with a flange 40 which projects horizontally and inwardly towards the roof of the vehicle. The flange 40 helps securing the ladder 12 in place when stored on the roof of the vehicle. The front ladder retaining assembly 32 also includes a stopper 42 which blocks the inner rail of the ladder 12 when stored on the roof. The stopper 42 is preferably made of a rubber-like material further preventing the ladder 12 from moving when in the stored configuration. The stopper 42 is configured with a section extending outwardly and at angle, which function is to force the inner rail 14 of the ladder 12 to slide in place in the front ladder retaining assembly 32 when the other end of the ladder 12 is raised. The front ladder retaining assembly 32 is preferably connected to the front transverse frame member 28 of the frame 18. However, it can be connected to other parts of the frame 18, and can be located near the center or even near the back of the vehicle. Of course, other configurations and/or elements can be used for the front ladder retaining assembly 32.

Now referring to FIGS. 8 and 9, the second assembly 44 of the ladder rack system 10 will be described. While the second assembly 44 is generally located near the rear section 22 of the frame 18, it can be considered to locate it elsewhere on the frame 18, such as close to the front section 20. In this case of course the first ladder retaining assembly 32 must be placed towards the rear of the vehicle.

The second assembly 44 includes the pivoting rail 46, which is formed by a pivotable portion 46a and a fixed portion 46b. The fixed portion 46b is attached to the rear section 22 of the frame 18. The pivotable portion 46*a* can pivot relative to the fixed portion 46*b*, but it can also be considered to have it pivot relative to the frame 18 as long as the pivotable and fixed portions 46*a*, 46*b* can be placed in alignment with one another, in the loading/unloading position. A pivot assembly 60 is used to pivotally connect the pivoting end 48 of the pivotable portion 46*a* to the outer end of the fixed portion 46*b*.

Figure 8:
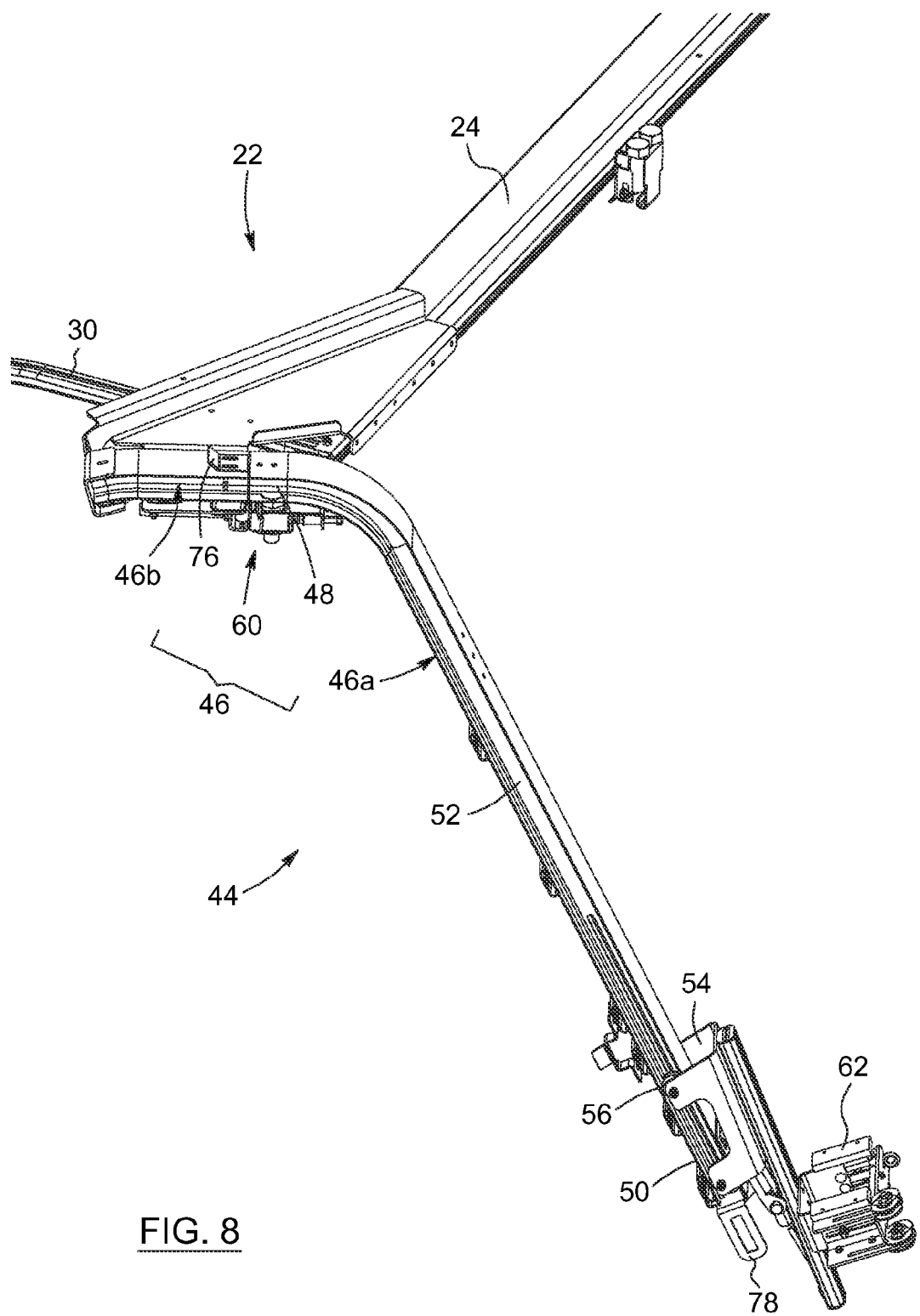
FIG. 8 is a top side perspective view of a rear portion of the ladder rack system, in the loading/unloading position.
Figure 9:
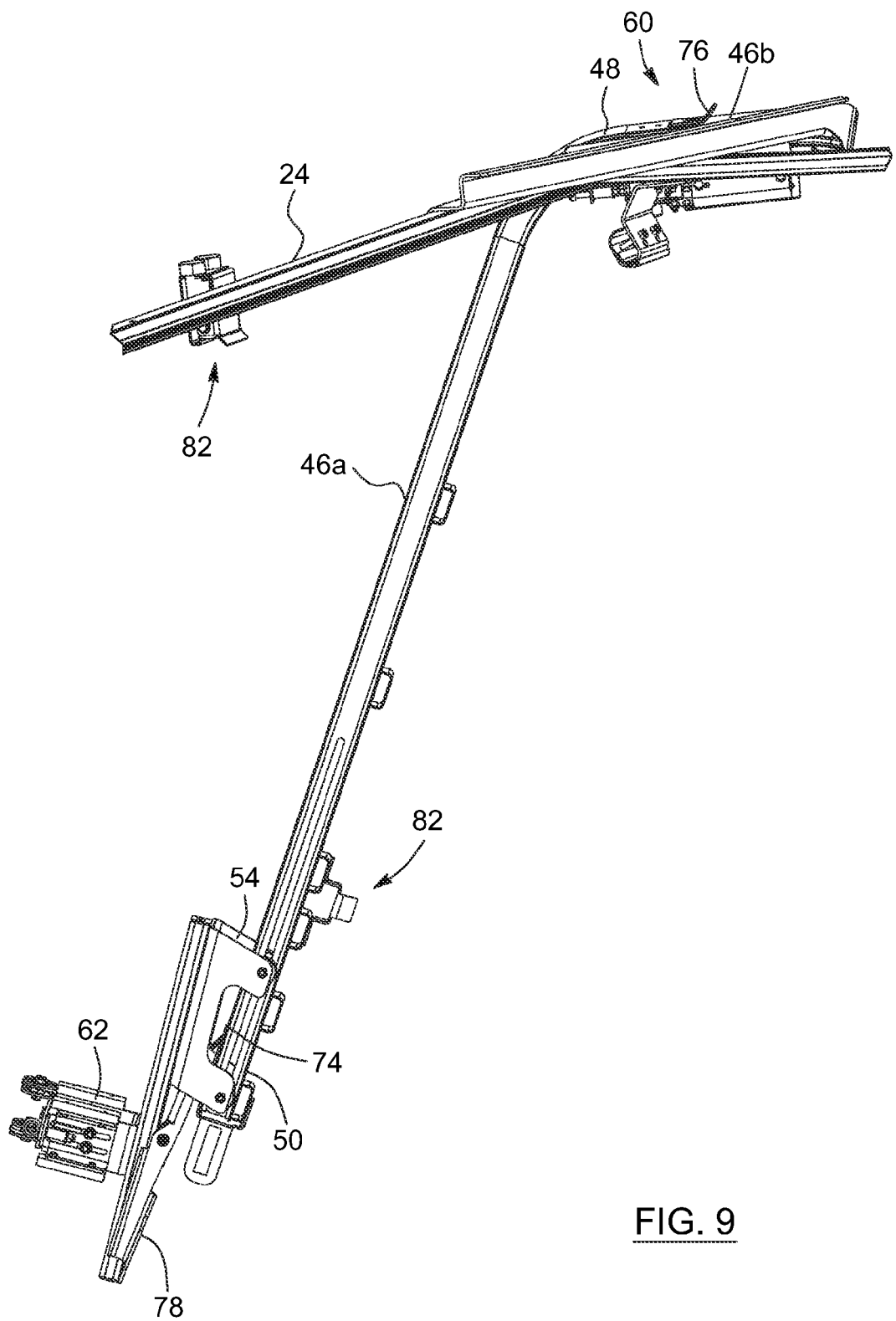
FIG. 9 is another top side perspective view of the rear portion of the ladder rack system, in the loading/unloading position.

Still referring to FIGS. 8 and 9, the carriage 54 is slid down on the pivotable portion 46*a* of pivoting rail 46, which is deployed substantively vertically along the vehicle and in alignment with the fixed portion 46*b*. When the pivotable portion 46*a* extends vertically downward, the carriage 54 can slide from the fixed portion 46*b* to the pivotable portion 46*a*, and vice versa. When the carriage 54 is stored on the fixed portion 46*b* of the pivoting rail 46, the pivotable portion 46*a* can be pivoted from its vertical orientation, as in FIG. 1, to a longitudinal and horizontal position, as in FIG. 3.

In the embodiment illustrated, the fixed and pivotable portions 46*b*, 46*a* are provided with at least one channel 52 extending longitudinally therealong. The pivoting rail 46 formed by fixed and pivotable portions 46*b*, 46*a* preferably comprises two channels 52 extending on both sides, in order for the carriage 54 to slide with more stability along the pivoting rail 46. Correspondingly, the carriage 54 includes sliding means 56 adapted to slide within the channel(s) 52 of the pivoting rail 46. The sliding means 56 can be of different types, and in the present case, they may consist of wheels located on each side of the carriage 54. Of course, other configurations can be considered. For example, a tube can be used as the pivoting rail 46, and the carriage 54 can be provided with an assembly including rollers, for rolling along the pivoting rail 46. Alternatively, it can be considered to provide the carriage 54 with skids or sliding blocks instead of wheels. A strap, a chain or a belt mechanism, and any other suitable mechanism may also be considered.

Still referring to FIGS. 8 and 9, the carriage 54 is provided with a retaining assembly 62. In the present case, the retaining assembly 62 comprises a U-shape plate and a hinged locking plate, for securing a ladder step therein. Of course, other types of retaining assembly 62 can be considered, such as for example a system of hooks, similar to the front ladder retaining assembly 32.

Best shown in FIG. 9, the second assembly 44 also comprises attaching means 82 for securing the pivoting rail 46 to the frame 18 when in the stored position. In this case, the attaching means 82 comprises two components, one attached to the right or left longitudinal frame members 24, 26 and one to the pivotable portion 46*a*. A carriage retaining plate 76 is mounted to the fixed portion 46*b*, for retaining the carriage 54 prior or during rotation of the pivotable portion 46*a* from the vertical/angled orientation to the horizontal/stored configuration. The carriage 54 is also provided with a handle 78, for sliding the carriage 54 along the pivoting rail 46 either manually, or with the help of a rod 80, such as shown in FIGS. 11B-11C.

Still referring to FIG. 9, the second assembly 44 preferably includes a damping assembly 74 for damping movement of the carriage 54 when the pivoting rail 46 is in the loading/unloading position and the carriage 54 is moved downwardly along the pivoting rail 46, towards its second, or outer, extremity 50. The damping assembly 74 can include a spring mechanism and a stopper. Other damping mechanisms can be considered, such as for example gas spring or hydraulic damping devices. Advantageously, the damping assembly 74 allows reducing the load of the ladder or ladder rack when raising the carriage 54.

Figure 10:
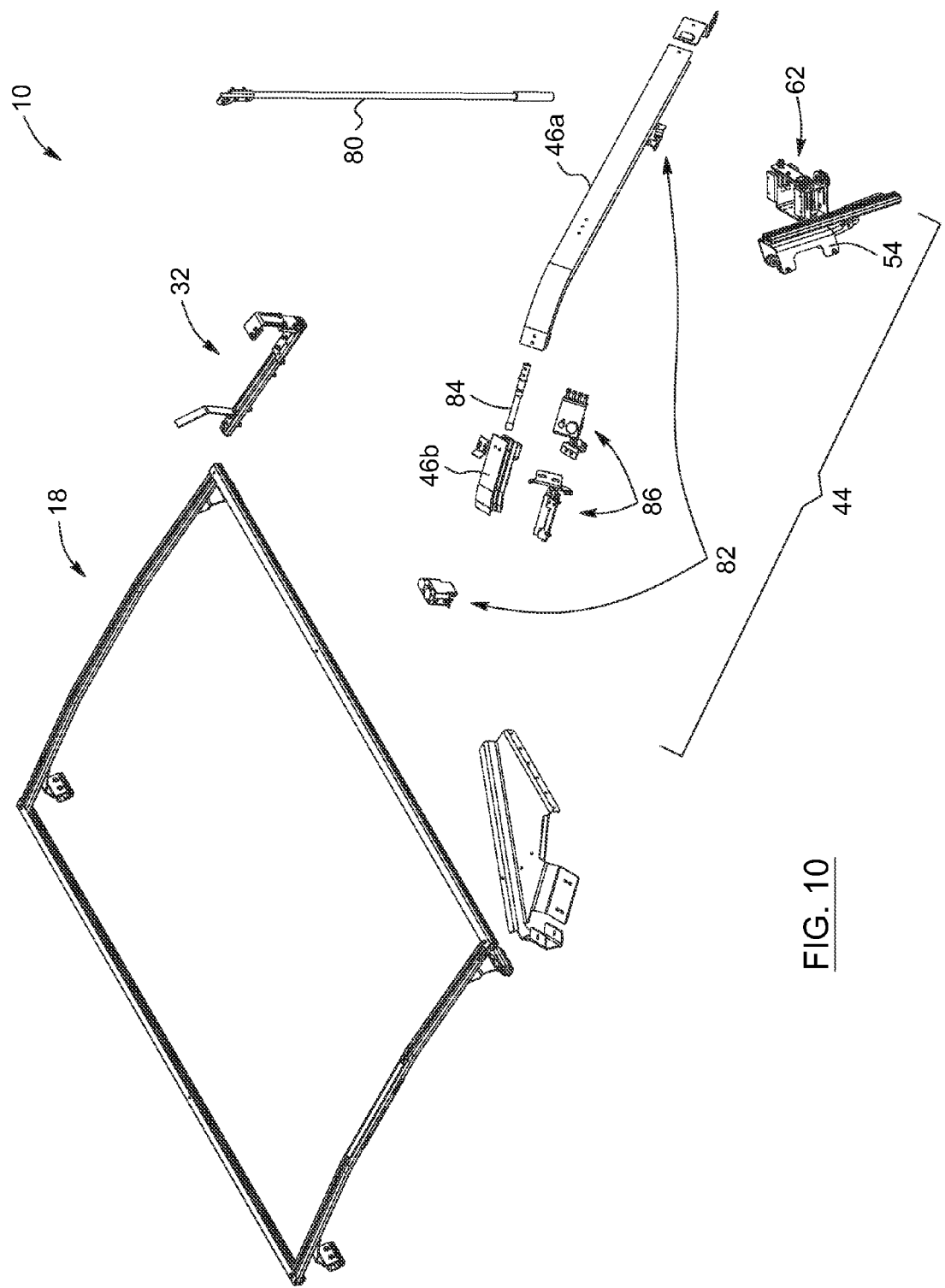
FIG. 10 is an exploded view of components of the ladder rack system, according to another embodiment.

Referring now to FIG. 10, the main components of the ladder rack system 10 are shown. This view allows seeing in more detail the pivoting mechanism. In the present embodiment, the pivotable and fixed portions 46*a*, 46*b* each include a connecting rod 84 for insertion in adjacent extremities of the tubes, for pivotally connecting the fixed and pivotable portions 46*b*, 46*a*. The second assembly 44 also includes a positioning mechanism 86, which allows aligning both fixed and pivotable portions 46*b*, 46*a* with one another when in the loading/unloading position. The ladder rack system 10 can also include a rod 80, for lifting or lowering the carriage 54 along the pivoting rail 46 and/or for pivoting the pivotable portion 46*a* when the carriage 54 is engaged on the fixed portion 46*b*. Of course, other types of pivoting mechanism can be considered.

Figure 11A:
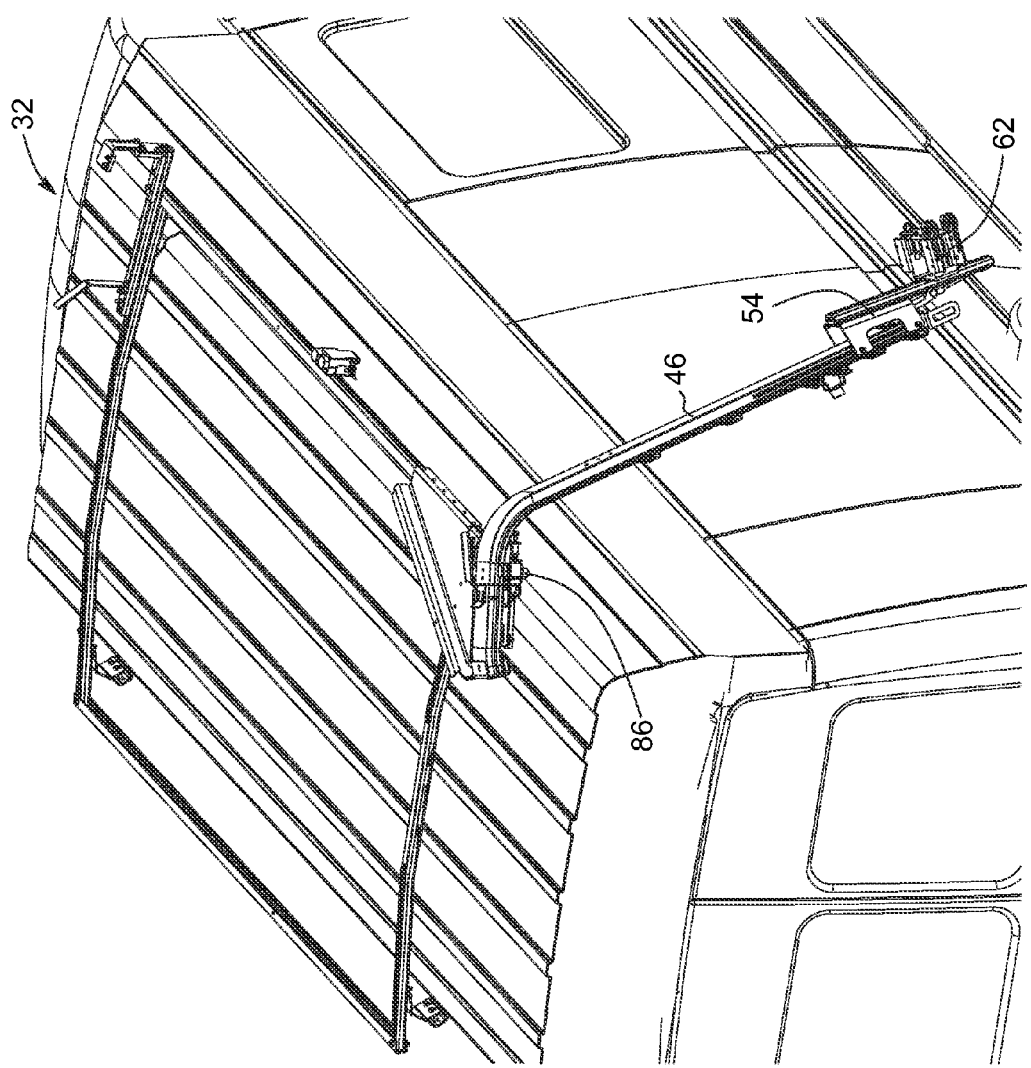
FIG. 11A is a top perspective view of the ladder rack system in the loading/unloading position, shown within its environment.
Figure 11B:
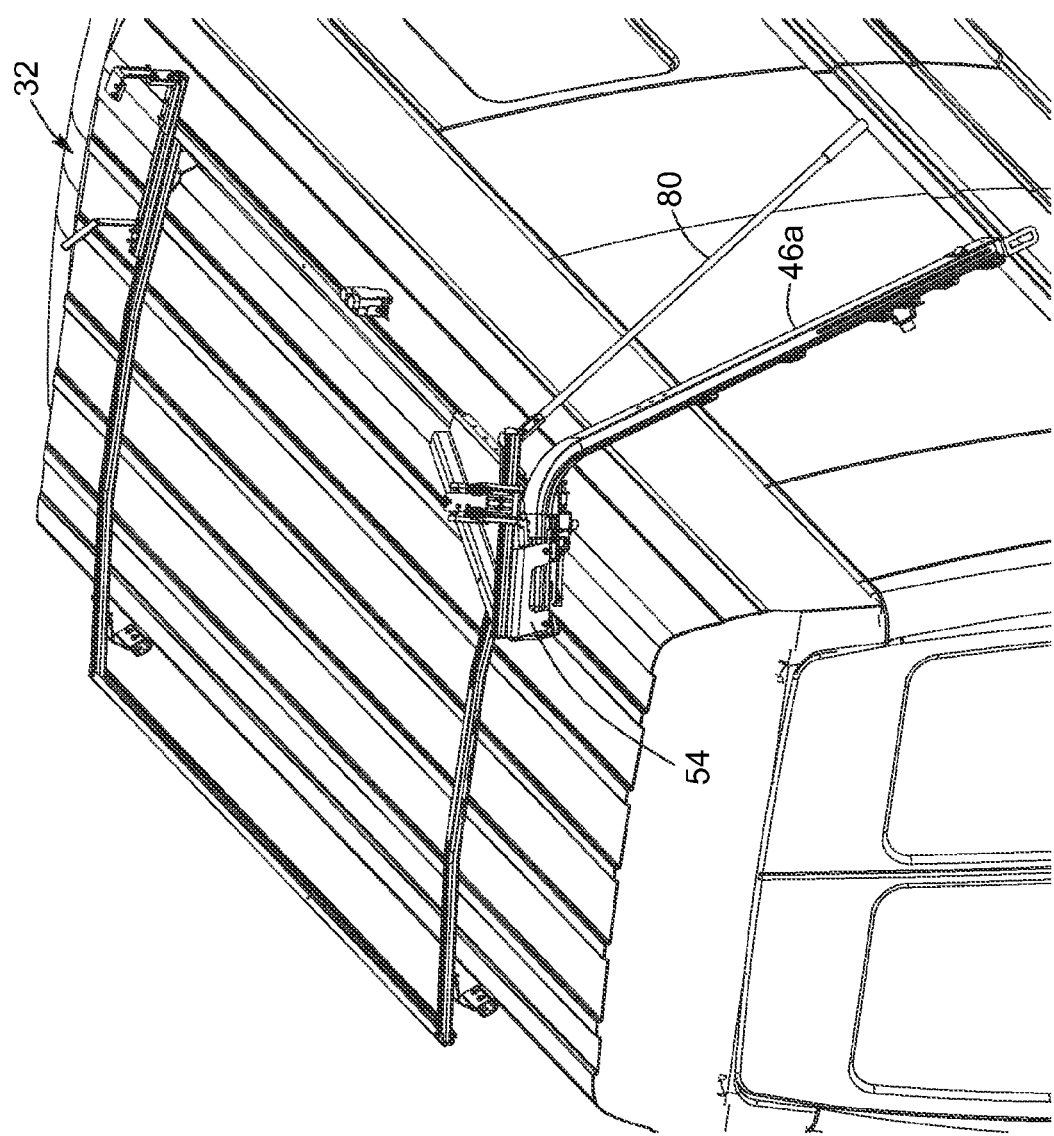
FIG. 11B is a top perspective view of the ladder rack system in a position between the stored and the loading/unloading positions.
Figure 11C:
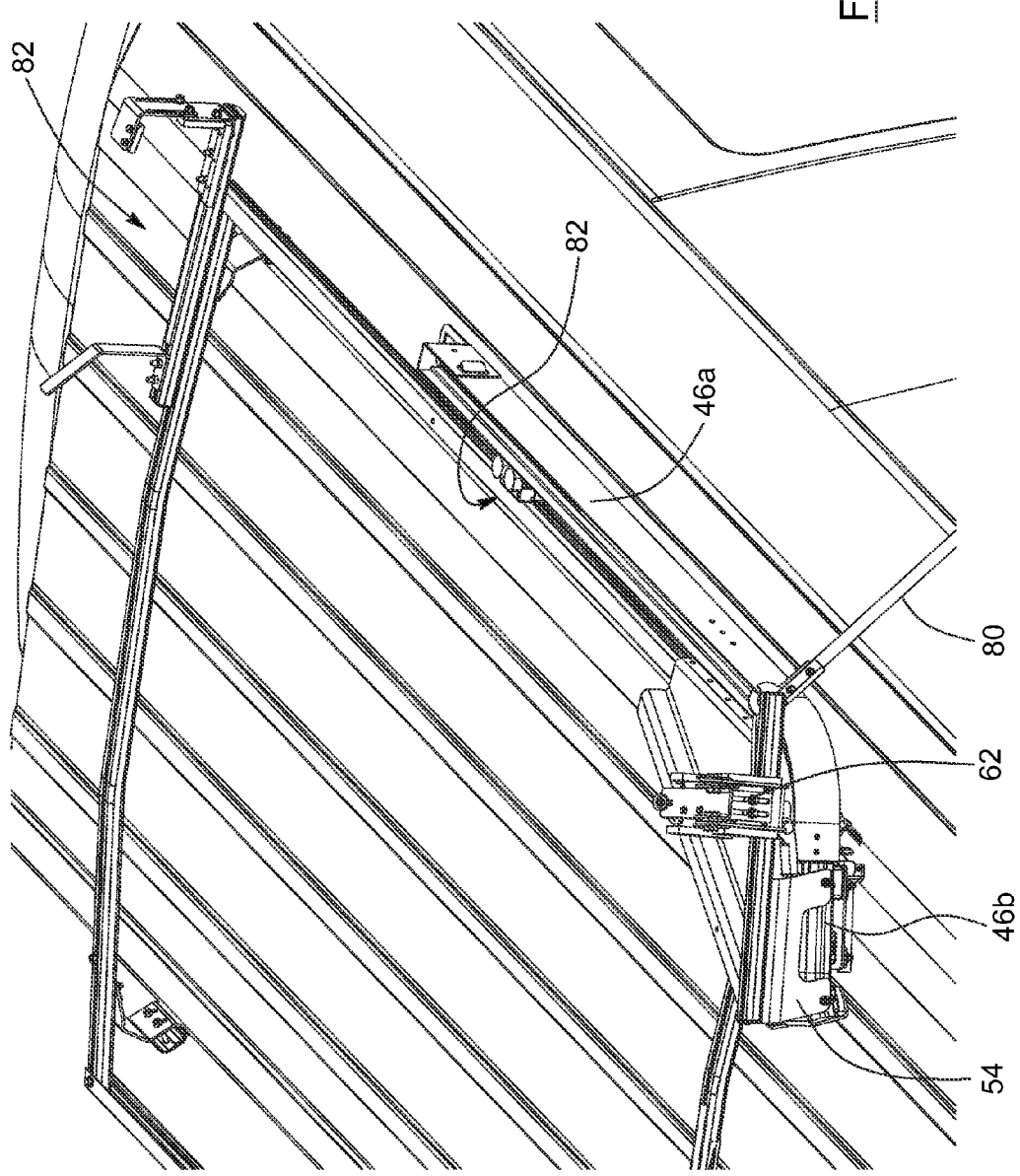
FIG. 11C is a top perspective view of the ladder rack system in the stored position, shown within its environment.
Figures 12B, 12C:
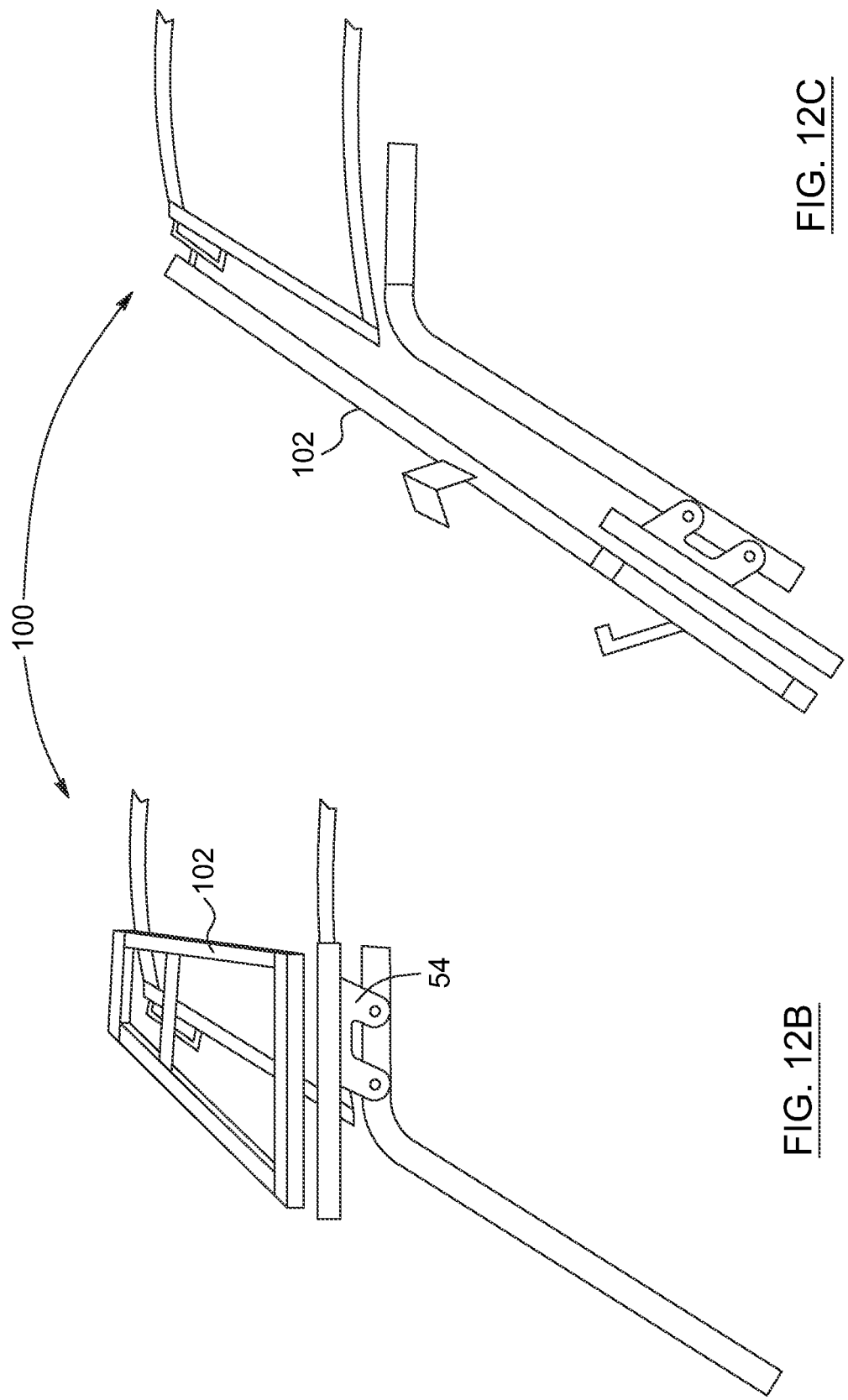
FIGS. 12B and 12C are partial rear views of the ladder rack system of FIG. 12, in stored and loading/unloading position, respectively.

Turning now to FIGS. 11A-11C, three different configurations of the ladder rack system 10 are shown. In FIG. 11A, the pivotable portion 46*a* of the pivoting rail 46 is placed in the loading/unloading position. As explained earlier, in this position, the pivotable portion 46*a* extends downwardly and substantially vertically along the side of the vehicle.

The carriage 54 is completely lowered on the pivoting rail 46. In this position, the top end of the ladder 12 can be laid on the front ladder retaining assembly 32 and the bottom end of the ladder 12 is raised and secured in the retaining assembly 62. The ladder 12 is not shown in FIGS. 11A-11C in order to more clearly see the ladder rack system 10.

Once the ladder 12 is loaded on the ladder rack system 10, on the side of the vehicle, the carriage 54 is slid upwardly along the pivoting rail 46 by pushing either one of the bottom end of the ladder 12 or the carriage 54 itself. As explained earlier, the damping assembly 74 allows reducing the load and thus facilitates lifting of the carriage 54. A rod 80 can also be used to lift the carriage 54 upwardly. The carriage 54 is slid up to the roof of the vehicle on the fixed portion 46*b* of the pivoting rail 46 which, as explained earlier, is in alignment with the pivotable portion 46*a*, thanks to the positioning mechanism 86. Raising the carriage 54 will cause the top end of the ladder 12 to slide and pivot about the front ladder retaining assembly 32. The top end of the ladder 12 will thus move from the front side of the vehicle to the front portion of the roof. Similarly, the bottom end of the ladder 12 moves from the rear side of the vehicle to the rear portion of the roof, the ladder 12 lying flat on the roof when stored. At this point, the rack system is as shown in FIG. 11B.

The pivotable portion 46*a* of the pivoting rail 46 can then be pivoted from the loading/unloading position to the stored position, such as is shown in FIG. 11C. The rod 80 can be used for moving the pivotable portion 46*a* from the loading/unloading position to the stored position. Once extending longitudinally along the roof of the vehicle, the pivotable portion 46*a* is attached to the frame 18 with attaching means 82. In the stored position, the carriage 54 is located between the bottom end of the ladder 12 and the roof of the vehicle, and is secured in place on the fixed portion 46*b* of the rail, the pivotable and fixed portion 46*a*, 46*b* being no longer in alignment with one another.

In other embodiments, it can be considered to include in the ladder rack system 10 a motorized assembly (not shown), for moving the carriage 54 up and down along the pivoting portion 46*a* of the pivoting rail 46 and/or for moving the pivotable portion 46*a* from the loading/unloading position to the stored position and vice versa. The motorized assembly may include at least one motor, which is preferably an electric motor; a pulling assembly, connected to the carriage and motor; and a controller, for controlling the motor. The pulling assembly can comprise for example a pulley system, a chain, a belt and the likes. The controller may include a user interface, which can comprise for example control buttons and/or a touch screen controllable from within the vehicle, or through a remote control. It can also be considered to have two different motors within the motorized assembly, one for moving the carriage, and one for rotating the rail.

Referring now to FIGS. 12 and 12A-12C, another embodiment of a ladder rack system 100 is shown. In this case, the system 100 includes a platform 102 for receiving a step ladder. One end of the platform 102 is mounted on the carriage 54, while the other end is mounted to a pivoting assembly 104 which is in turn attached to the frame 18. The platform must also be able to rotate and slide/translate when the platform is raised from the loading/unloading position to the stored position, as indicated by arrows on FIGS. 12 and 12A. As such, the ladder rack system 100 also includes a sliding mechanism, which can be part of the rear assembly 108 and/or the front assembly 104. The platform 102 includes front and rear retaining elements 106, for retaining the ladder rack in place once loaded on the platform 102.

As it can be appreciated, the present invention allows one to smoothly load and unload a ladder 12 from and to a vehicle with limited effort. Thanks to the pivoting rail 46 and carriage 54, the second assembly 44 is placed closer to the ground, which facilitates loading of the bottom end of the ladder 12 on the retaining assembly 62. Moving the ladder 12 from the side to the roof of the vehicle is also facilitated thanks to the carriage 54, which can be easily slid along the pivoting rail 46 with limited force. Finally, when in the stored position, the ladder 12 is securely retained in place and the pivoting rail 46 is conveniently stored on the roof side of the vehicle, out of the way of the user.

According to another embodiment, there is provided a method for storing a ladder 12 on the roof of the vehicle. The vehicle is provided with a ladder rack system 10 as defined above. The method comprises the steps of: placing the pivoting rail 46 in the loading/unloading position and sliding the carriage 54 downwardly along the pivoting rail 46 down to an extremity of the pivoting rail 46 (i.e., to an extremity of the pivotable portion 46a), engaging (i.e., for allowing a removable connection) a first end of the ladder 12 on the front ladder retaining assembly 32, raising and placing a second end of the ladder 12 on the second assembly 44; sliding the carriage 54 upwardly, the first end of the ladder 12 pivoting about the front ladder retaining assembly 32, until the ladder 12 is positioned on the roof of the vehicle and pivoting the pivoting rail 46 (i.e., the pivotable portion 46a) from the loading/unloading position to the stored position.

The ladder rack system 10 as defined above may allow lowering one end of the ladder 12 closer to the ground when in a loading/unloading position. The ladder rack system 10 may further allow the ladder 12 to easily move from a loading/unloading position to a stored position on the roof of the vehicle. The ladder rack system may further be compact and convenient when in the stored position.

According to yet another embodiment, there is provided a rack system (not shown) for displacing a substantially longitudinal load between a loading/unloading position on a side of a storing area and a stored position on a surface of the stored area. The substantially longitudinal load has a first load end and a second load end. It is to be noted that the storing position may be at a distance above the loading/unloading position (i.e., the loading/unloading position being near a ground surface. The ladder rack system includes a first assembly to be mounted on a first end of the storing area for receiving the first load end; and a second assembly to be mounted on a second end of the storing area at a distance from the first end for receiving the second load end. The second assembly includes a pivoting rail to be pivoted between the loading/unloading position in which the pivoting rail extends substantially vertically or at an angle on a side of the storing area and the stored position in which the pivoting rail extends longitudinally along the storing area. The second assembly further includes a carriage slidably mounted on the pivoting rail for receiving the second load end and for sliding along the pivoting rail when the pivoting rail is in the loading/unloading position. When the carriage is slid on the surface of the storing area, the pivoting rail can be pivoted in the stored position longitudinally along the surface of the storing area as described for the ladder rack system 10 as described above.

The substantially longitudinal load may include a first load mating connector near the first load end and a second load mating connector near the second load end. The first assembly may include a first assembly mating connector for releasably connecting with the first load mating connector and a second assembly mating connector for releasably connecting with the second load mating connector.

According to other embodiment, the substantially longitudinal load may be, a sport equipment such as a kayak, a pair of skis, a surfboard, a construction material, a ladder and any substantially longitudinal equipment which need to be loaded and/or unloaded at/from a distance from the ground surface (i.e., a shelf, a roof top of a vehicle, a roof top of a trailer and the like).

The rack system as defined above may allow lowering one end of the load closer to the ground when in a loading/unloading position. The rack system may further allow the load to easily move from a loading/unloading position to a stored position on the surface defined by the storing area. The rack system may further be compact and convenient when in the stored position.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A ladder rack system for displacing a ladder between a loading/unloading position on one of a side, a front and a rear of a vehicle and a stored position on a roof top of a vehicle, the ladder having a first ladder end and a second ladder end, the ladder rack system comprising:
   a first assembly to be mounted on a first end of the roof top for receiving the first ladder end; and
   a second assembly to be mounted on a second end of the roof top at a distance from the first end for receiving the second ladder end, the second assembly comprising:
   a pivoting rail defining a pivot end, the pivoting rail to be pivoted about the pivot end between the loading/unloading position in which the pivoting rail extends substantially vertically or at an angle on the one of a side, a front and a rear of the vehicle and the stored position in which the pivoting rail extends longitudinally along the roof top, the pivoting rail pivoting about the pivot end to travel in a plane that is substantially parallel to the one of a side, a front and a rear of the vehicle; and
   a carriage slidably mounted on the pivoting rail for receiving the second ladder end and for sliding along the pivoting rail when the pivoting rail is in the loading/unloading position;

wherein when the carriage is slid on the roof of the vehicle, the pivoting rail can be pivoted in the stored position longitudinally along the roof top.

2. The ladder rack system of claim 1, wherein the pivoting rail comprises a fixed portion mounted on the second end of the roof top and a pivotable portion extending from the fixed portion and capable of pivoting relative to the fixed portion.

3. The ladder rack system of claim 2, wherein when the pivotable portion of the pivoting rail is deployed substantially vertically along the vehicle and in alignment with the fixed portion, the carriage can slide from one of the fixed portion to the pivotable portion and from the pivotable portion to the fixed portion and further wherein when the carriage is stored in the fixed portion of the pivoting rail, the pivotable portion can pivot between the loading/unloading position substantially vertical along the one of a side, a front and a rear of the vehicle and the stored position longitudinally along the roof top of the vehicle.

4. The ladder rack system of claim 2, wherein the pivoting rail comprises a pivot assembly for pivotally connecting a pivoting end of the pivotable portion to an outer end of the fixed portion.

5. The ladder rack system of claim 2, wherein the fixed portion and the pivotable portion of the pivoting rail each comprises a channel extending longitudinally therealong for allowing the carriage to slide along the pivoting rail and a sliding element slidably connected between the channel and the carriage adapted to slide within the channel.

6. The ladder rack system of claim 5, wherein the channel comprises two channels extending on both sides of the fixed portion and the pivotable portion of the pivoting rail.

7. The ladder rack system of claim 2, wherein the carriage comprises a retaining assembly for retaining the first ladder end and a positioning mechanism connected to both the fixed portion and the pivotable portion of the pivoting rail for allowing alignment of the fixed portion and the pivotable portion of the pivoting rail when in the loading/unloading position.

8. The ladder rack system of claim 7, wherein the retaining assembly comprises a U-shape plate and a hinged locking plate operatively connected to the U-shape plate for securing a ladder step of the ladder therein.

9. The ladder rack system of claim 1, further comprising a frame to be mounted on the roof top of the vehicle for receiving the first assembly and the second assembly at respective first and second ends of the roof top of the vehicle.

10. The ladder rack system of claim 1, wherein one of the second assembly and the vehicle comprises an attaching member for securing the pivoting rail to the vehicle when the second assembly is in the stored position.

11. The ladder rack system of claim 2, further comprising a carriage retaining member mounted on the fixed portion of the pivoting rail for retaining the carriage prior or during rotation of the pivotable portion of the pivoting rail between the loading/unloading position and the stored position.

12. The ladder rack system of claim 1, wherein the carriage comprises a handle, a hook or any suitable combination for sliding the carriage along the pivoting rail.

13. The ladder rack system of claim 1, wherein the second assembly comprises a damping assembly for damping longitudinal movement of the carriage when the pivoting rail is in the loading/unloading position and the carriage is moved towards a bottom end of the pivotable portion of the pivoting rail or for damping the pivoting rail when being pivoted between the loading/unloading position and the stored position.

14. The ladder rack system of claim 1, wherein the first assembly comprises a hook having a first leg extending substantially vertically from the roof top and a second leg extending substantially horizontally along the roof top and further wherein the first assembly comprises a stopper for blocking an inner rail of the ladder when in the stored position on the roof top of the vehicle, the stopper comprising a section extending outwardly at an angle for forcing the inner rail of the ladder to slide in place in the first assembly when the second ladder end is raised above a ground surface.

15. The ladder rack system of claim 14, wherein the hook comprises an L-shape and an outer end with a flange projecting horizontally and inwardly towards the roof top of the vehicle for securing the ladder in place when in the stored position on the roof top of the vehicle.

16. A rack system for displacing a substantially longitudinal load between a loading/unloading position on one of a side, a front and a rear of a storing area and a stored position on a surface of the stored area, the substantially longitudinal load having a first load end and a second load end, the storing position being at a distance above the loading/unloading position, the ladder rack system comprising:
a first assembly to be mounted on a first end of the storing area for receiving the first load end; and
a second assembly to be mounted on a second end of the storing area at a distance from the first end for receiving the second load end, the second assembly comprising:
a pivoting rail defining a pivot end, the pivoting rail to be pivoted about the pivot end between the loading/unloading position in which the pivoting rail extends substantially vertically or at an angle on the one of a side, a front and a rear of the storing area and the stored position in which the pivoting rail extends longitudinally along the storing area, the pivoting rail pivoting about the pivot end to travel in a plane that is substantially parallel to the one of a side, a front and a rear of the storing area;
a carriage slidably mounted on the pivoting rail for receiving the second load end and for sliding along the pivoting rail when the pivoting rail is in the loading/unloading position;
wherein when the carriage is slid on the surface of the storing area, the pivoting rail can be pivoted in the stored position longitudinally along the surface of the storing area.

17. The rack system of claim 16, wherein the substantially longitudinal load comprises a first load mating connector near the first load end and a second load mating connector near the second load end, wherein the first assembly comprises a first assembly mating connector for releasably connecting with the first load mating connector and a second assembly mating connector for releasably connecting with the second load mating connector.

* * * * *